April 8, 1969
H. B. FISHER
3,437,144
CONSOLIDATION OF FORMATIONS
Filed Aug. 26, 1966
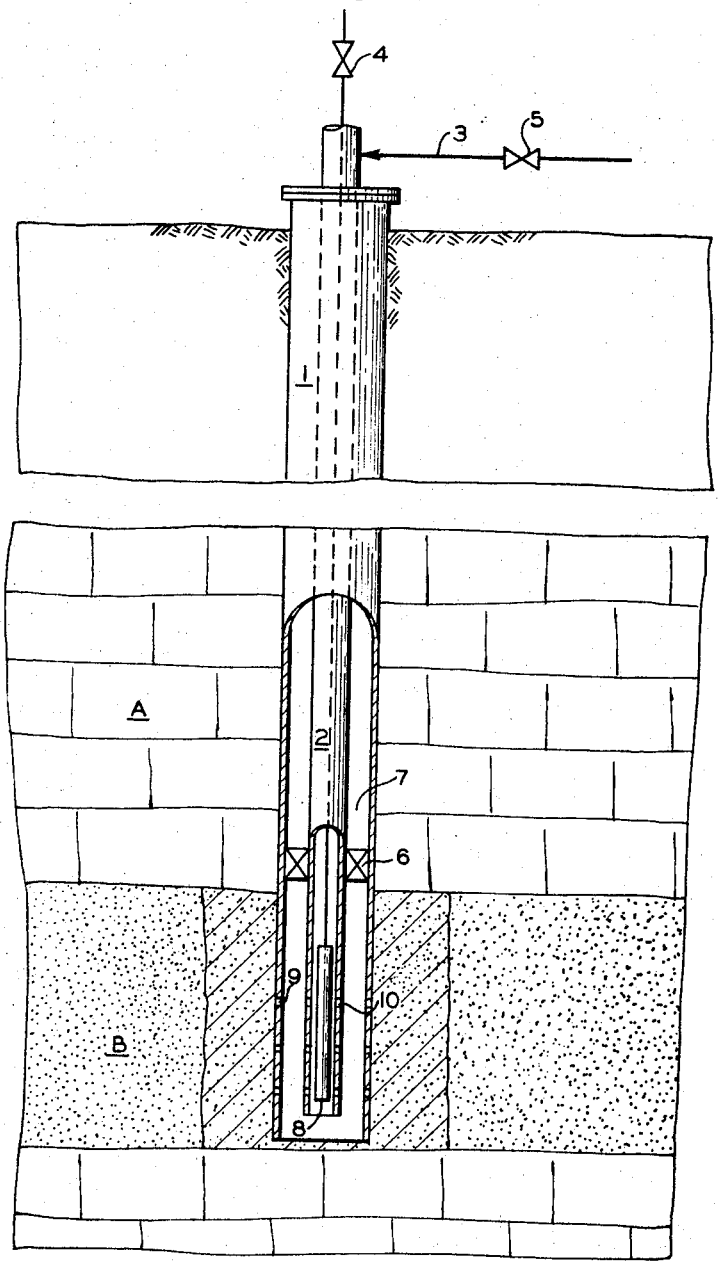
INVENTOR
H. B. FISHER
BY
*Young & Quigg*
ATTORNEYS

United States Patent Office 3,437,144
Patented Apr. 8, 1969

3,437,144
CONSOLIDATION OF FORMATIONS
Henry B. Fisher, Bartlesville, Okla., assignor to Phillips
Petroleum Company, a corporation of Delaware
Filed Aug. 26, 1966, Ser. No. 575,447
Int. Cl. E21b 33/138
U.S. Cl. 166—288          5 Claims

ABSTRACT OF THE DISCLOSURE

Earth formations are consolidated by reacting sulfur and an oil to form a char in the formation.

A solution of sulfur and oil is injected into an unconsolidated earth formation, and then heated sufficiently such that the sulfur and oil chemically react to form a char which binds the particles of the formation together. In a second embodiment, sulfur is injected into an oil-bearing formation, and there caused to form a char by reaction with the oil in place at an elevated temperature.

---

This invention relates to the consolidation of formations. In one of its aspects it relates to the consolidation of a formation which contains sand which is produced, or similar particulate material. In another of its aspects, it relates to the bonding together of such material.

In one of its concepts, the invention provides a method for the consolidation of particulate material such as sand in a formation by causing sulfur and oil to react in the formation to produce a char. In another of its concepts, the invention provides a method for producing a char in a formation to bond together therein particles or portions of the formation which comprises injecting into said formation a solution of sulfur and oil, and in said formation causing reaction of the sulfur and the oil to produce a char. In a still further concept of the invention, it provides a method as described in which sulfur is injected into an oil-bearing formation and there caused to form a char by reaction with said oil at, say, an elevated temperature.

The production of sand, along with oil from unconsolidated formations or a formation which contains loose or loosenable sand or like particles is a serious oil field production problem. Also, the general problem of consolidating formations for various reasons is well known. The variety of problems encountered can vary from undermining of an overlying formation which subsequently collapses resulting in a loss of a well or mine to the constant expense of replacing eroded pump parts in the event a liquid or gas is being produced from a formation containing loose particles as heretofore discussed. In the oil field, the problem can be somewhat overcome with use of gravel packs, slotted liners, consolidation of the sand by plastic, etc. However, the ultimate objective is to deal with a formation which does not require such special precautions or expensive plastic.

I have now conceived a method for consolidation of a formation containing sand or other particles which comprises bonding the particles together by forming a char with oil and sulfur in the formation.

It is an object of this invention to consolidate a formation. It is a further object of this invention to provide a method for consolidating a formation containing sand or other loose or loosenable particles. It is still a further object of the invention to provide a method for consolidating a sand formation so that a liquid or gas can be produced therefrom without erosion of equipment used in such production. It is a still further object of the invention to consolidate an oil or gas formation. It is another object of the invention to consolidate an overlying formation beneath which drilling or excavation may be desired.

Other concepts, objects and the several advantages of this invention are apparent from a study of this description, the drawing, and the appended claims.

According to the present invention, a formation is consolidated by producing within the formation a reaction of sulfur and oil, for example at an elevated temperature such that the oil and sulfur form a char. This char binds the particles and thus consolidates the formation.

In one embodiment of the invention, consolidated sand in the formation is formed by injecting oil containing dissolved sulfur into the unconsolidated formation and then heating the formation with a burner or electric bottom hole heater in the formation in, but not necessarily in, the oil and sulfur injection well. Or, the reaction between the dissolved sulfur and the oil can be caused by injecting hot combustion gases into said well so that the temperature reaches 250° F. or higher. In an oil-containing formation, the oil reservoir temperature will be raised to a temperature approximating 250° F. or higher, after sulfur has been injected into the formation, for example, as it may be dissolved in a suitable solvent which can be oil or additional oil as the case may be. Steam heating can also be employed.

The char is produced by the sulfur oxidation of the oil and the char is insoluble in any oil that remains present. Thus, this char acts as a binder for the grains, for example, sand grains.

On occasion, it is necessary to prereact the sulfur with the oil to eliminate suspended sulfur from the oil. For example, when the sulfur is suspended in the oil in an amount such that the sulfur would tend to plug the formation before enough of it has penetrated so that a suitable char can be obtained, prereaction is advisable. Prereaction can be used to minimize the amount of hydrogen sulfide which will be evolved, thus reducing the amount of this corrosive substance which will be present in the equipment.

One skilled in the art in possession of this disclosure having studied the same will recognize that variables in this invention involve the sulfur solvent, sulfur content of the solvent, time, temperature, and method of heating when heating is used to cause the reaction to occur.

Referring now to the drawing, there is shown essentially in cross sectional view, a formation A having a section B which consists of unconsolidated sand and which is a producing formation. A well casing 1 has been set. Within this casing there is injection pipe 2 to which oil containing dissolved sulfur is passed by pipe 3. When this is being done, valve 4 is closed and valve 5 is opened, and there is a packer 6 preventing the injected sulfur solution from rising in the annulus 7. A bottom hole heater 8 has been lowered through pipe 2 and allows heating of formation B. As can be seen, and as is usually the case, there are provided perforations 9 and 10 which enable the heat from heater 8 to penetrate into formation B.

The formation of the char must, of course, not plug entirely against flow of liquid such as oil to be produced, and one skilled in the art having studied this disclosure will select the amount of oil and sulfur to produce a char which does not undesirably cut down the permeability or flow in the formation.

The following are specific examples of consolidation of mechanically unstable sand containing formations. Good permeability was maintained.

SPECIFIC EXAMPLES

| Sample | 1 | 2 | 3 | 4 | 5 |
|---|---|---|---|---|---|
| Gms. sand | 400 | 400 | 400 | 400 | 400 |
| Ml. diesel oil | 125 | 125 | 125 | 125 | 125 |
| Gms. sulfur | 15 | 30 | 45 | 60 | 90 |
| Properties of samples heated in bomb at 400° F., cohesion | None | None | (¹) | Hard | Hard |
| Air permeability (md.) | | | 3,570 | 1,030 | 1,130 |
| More sulfur added and samples reheated: | | | | | |
| Gms. sulfur | +45 | +30 | | | |
| Air permeability (md.) | 320 | 360 | | | |

¹ Lower part.

Consolidation of mechanically unstable sand formations is accomplished by injecting oil containing dissolved sulfur into the formation and then heating the permeated formation to 250° F. or higher so that the sulfur oxidizes the oil and produces a char which is oil insoluble and has the capacity to bind the sand grains with maintenance of permeability.

The oils used to accomplish the invention can be various. One skilled in the art can select oil which best suits his purpose. Although, as a rule, a large percentage of aromatics is preferably avoided, but only due to the relative difficulty in charring oils containing them, aromatics are desirable at least to an extent because of their good solvency for sulfur.

Reasonable variation and modification are possible within the scope of the foregoing disclosure, the drawing and the appended claims to the invention, the essence of which is that formations are consolidated by reacting sulfur and an oil to form a char in the formation.

I claim:

1. A method for treating a formation wherein the formation contains sand or like material which is produced from the formation together with a liquid produced from the formation and it is desired to consolidate said sand in said formation and to avoid its production with said liquid the steps which comprise injecting sulfur into the formation dissolved in an oil oxidizable therewith at an elevated temperature and then subjecting the formation to a temperature and for a time such that the oil is charred forming a binder for said material.

2. A method according to claim 1 wherein the formation is an oil-producing formation and sulfur is injected into the formation and therein heated to cause the formation of a char with said oil.

3. A method according to claim 2 wherein the temperature is raised by injecting hot combustion gases into the formation after the sulfur and oil are each in the presence of the other in the formation.

4. A method according to claim 3 wherein the formation is heated with a burner lowered into a portion or section of the formation.

5. A method according to claim 3 wherein the formation is heated by an electric heater positioned in a well in said formation.

References Cited

UNITED STATES PATENTS

| | | | |
|---|---|---|---|
| 1,398,563 | 11/1921 | Nolan | 166—25 X |
| 1,866,522 | 7/1932 | Jackson et al. | 166—25 |
| 2,341,573 | 2/1944 | Reed | 166—25 |
| 2,363,269 | 11/1944 | Schlumberger | 166—25 |
| 3,147,805 | 9/1964 | Goodwin et al. | 166—25 |
| 3,163,218 | 12/1964 | Allen et al. | 166—25 |
| 3,254,715 | 6/1966 | Morse | 166—25 |
| 3,292,701 | 12/1966 | Goodwin et al. | 166—25 |
| 3,302,715 | 2/1967 | Smith et al. | 166—25 |

STEPHEN J. NOVOSAD, *Primary Examiner.*